(12) United States Patent
Yano et al.

(10) Patent No.: US 8,771,453 B2
(45) Date of Patent: Jul. 8, 2014

(54) METHOD FOR MANUFACTURING LIQUID CRYSTAL PANEL

(75) Inventors: Kohei Yano, Ibaraki (JP); Minoru Miyatake, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 170 days.

(21) Appl. No.: 13/124,151

(22) PCT Filed: Oct. 7, 2009

(86) PCT No.: PCT/JP2009/005199
§ 371 (c)(1),
(2), (4) Date: Apr. 14, 2011

(87) PCT Pub. No.: WO2010/044218
PCT Pub. Date: Apr. 22, 2010

(65) Prior Publication Data
US 2011/0192529 A1  Aug. 11, 2011

(30) Foreign Application Priority Data

Oct. 16, 2008 (JP) ................................ 2008-266943
Oct. 5, 2009 (JP) ................................ 2009-231566

(51) Int. Cl.
*B29C 65/00* (2006.01)
(52) U.S. Cl.
USPC ....................................................... 156/229
(58) Field of Classification Search
USPC ........................................................ 156/229
IPC ..................................................... B29C 65/00
See application file for complete search history.

(56) References Cited

U.S. PATENT DOCUMENTS

| | | |
|---|---|---|
| 2002/0015807 A1 | 2/2002 | Sugino et al. |
| 2004/0173301 A1* | 9/2004 | Tsai et al. ........................ 156/64 |
| 2005/0145321 A1 | 7/2005 | Tsai et al. |
| 2005/0260392 A1 | 11/2005 | Sugino et al. |
| 2006/0227423 A1* | 10/2006 | Saiki et al. ..................... 359/490 |

FOREIGN PATENT DOCUMENTS

| | | | |
|---|---|---|---|
| JP | 6-347641 | A | 12/1994 |
| JP | 2000-338329 | A | 12/2000 |
| JP | 2001-030427 | A | 2/2001 |
| JP | 2001-343521 | A | 12/2001 |
| JP | 2001-343522 | A | 12/2001 |
| JP | 2001-350021 | A | 12/2001 |
| JP | 2001343521 | A * | 12/2001 |
| JP | 2001343522 | A * | 12/2001 |
| JP | 2002-006133 | A | 1/2002 |
| JP | 2004-272183 | A | 9/2004 |

OTHER PUBLICATIONS

International Search Report of PCT/JP2009/005199, mailing date Nov. 2, 2009.

* cited by examiner

*Primary Examiner* — Michael Orlando
(74) *Attorney, Agent, or Firm* — Westerman, Hattori, Daniels & Adrian, LLP

(57) ABSTRACT

There is provided a method for manufacturing a liquid crystal panel comprises the steps of:
(Step A1) manufacturing a polarizing film including a laminate composed of a first base film and a polarizing thin layer, the step including: applying a vinyl alcohol-based polymer on a surface of the first base film to form a vinyl alcohol-based polymer thin layer; and wet dyeing the vinyl alcohol-based polymer thin layer after stretching the thin layer together with the first base film to obtain a polarizing thin layer, and
(Step B1) adhering the polarizing film without an adhesion layer during storage and transportation at least to one surface of a liquid crystal cell through an adhesion layer in a liquid crystal panel manufacturing process.

5 Claims, No Drawings

# METHOD FOR MANUFACTURING LIQUID CRYSTAL PANEL

TECHNICAL FIELD

The present invention relates to a method for manufacturing a liquid crystal panel which comprises a polarizing film, an adhesion layer, and a liquid crystal cell in this order.

BACKGROUND OF THE INVENTION

Conventional polarizing films supplied from a polarizing film manufacturing process to a liquid crystal panel manufacturing process are so configured that polarizing plates, adhesion layers (adhesives), and release liners are integrated (For instance, Japanese Patent Application Unexamined Publication No. 2001-30427 A). Typically, in polarizing films, stretched and dyed polyvinyl alcohol films (films with a thickness of some ten μm) are held with two protective films. There is a possibility that such polarizing plates may peel off and have leakage of light due to the generation of distortion when adhering these polarizing plates to liquid crystal cells because significant expansion and contraction are caused by changes of temperature and humidity. In these conventional polarizing films, therefore, adhesives (adhesion layers) exclusively designed for each kind are preliminarily laminated (adhesion processing).

SUMMARY OF THE INVENTION

However, the conventional polarizing films have the following problems, which pose a major obstacle to efficient manufacturing of liquid crystal panels:

(1) Since adhesives and release liners to be used for polarizing films have a large thickness and a heavy weight, the quantity of the polarizing films (total area) loadable into one predetermined truck is typically limited and the transportation efficiency is low when transporting the polarizing films.

(2) In a case where an adhesive is preliminarily laminated on a polarizing film, it is necessary to cure the polarizing film by heating or the like after laminating the adhesive on a polarizing plate. Thus, the lead time for manufacturing polarizing films is long.

(3) The adhesive to be used for the polarizing film tends to be deteriorated due to influence of moisture contained in the adjacent polarizing plate. This makes it impossible to have a long quality guarantee period of the polarizing film.

The summary of the present invention is as follows:

In a first preferred embodiment, a method for manufacturing a liquid crystal panel including a polarizing film which includes a laminate composed of a first base film and a polarizing thin layer, an adhesion layer, and a liquid crystal cell in this order according to the present invention comprises the following steps A1 and B1:

(Step A1): manufacturing a polarizing film, the step comprises: applying a vinyl alcohol-based polymer on a surface of the first base film to form a vinyl alcohol-based polymer thin layer; and wet dyeing the vinyl alcohol-based polymer thin layer after stretching the thin layer together with the first base film to obtain a polarizing thin layer in a polarizing film manufacturing process.

(Step B1): adhering the polarizing film without an adhesion layer during storage and transportation at least to one surface of the liquid crystal cell through an adhesion layer in a liquid crystal panel manufacturing process.

In a second preferred embodiment, a method for manufacturing a liquid crystal panel including a polarizing film which includes a laminate composed of a second base film and a polarizing thin layer, an adhesion layer, and a liquid crystal cell in this order according to the present invention further comprises the following step A2 and B2:

(Step A2): manufacturing a polarizing film including a laminate composed of a second base film and a polarizing thin layer, the step comprises: applying a vinyl alcohol-based polymer on a surface of the first base film to form a vinyl alcohol-based polymer thin layer in a polarizing film manufacturing process; wet dyeing the vinyl alcohol-based polymer thin layer after stretching the thin layer together with the first base film to obtain a polarizing thin layer; and releasing the first base film while or after laminating a plane of the polarizing thin layer, which is not in contact with the first base film, on the second base film.

(Step B2): adhering the polarizing film without an adhesion layer during storage and transportation at least to one surface of the liquid crystal cell through the adhesion layer in a liquid crystal panel manufacturing process.

In a third preferred embodiment, the method for manufacturing a liquid crystal panel according to the present invention further comprises the steps of: performing step A1 in a polarizing film manufacturing plant; transporting the obtained polarizing film without an adhesion layer for adhering to the liquid crystal cell to a liquid crystal panel manufacturing plant; and performing step B1 in the liquid crystal panel manufacturing plant.

In a fourth preferred embodiment, the method for manufacturing a liquid crystal panel according to the present invention further comprises the steps of: performing step A2 in a polarizing film manufacturing plant; transporting the obtained polarizing film without an adhesion layer for adhering to the liquid crystal cell to a liquid crystal panel manufacturing plant; and performing step B2 in the liquid crystal panel manufacturing plant.

In a fifth preferred embodiment of the method for manufacturing a liquid crystal panel according to the present invention, the polarizing thin layer has a thickness of 1 μm to 6 μm.

The polarizing film including the laminate composed of the first base film or the second base film and the polarizing thin layer obtained by step A1 or step A2 in the present invention has a dimension change rate caused by changes of temperatures and humidity approximately one tenth of a polarizing film formed by stretching and dyeing a conventional polyvinyl alcohol film (a film with a thickness of some ten μm).

Therefore, there are no fears that the polarizing film obtained by step A1 or step A2 may peel off or has a leakage of light caused by distortion, even if the polarizing film is bonded to the liquid crystal cell using an adhesive for general-purpose. Accordingly, the polarizing film to be used in the present invention does not need to previously laminate (adhesion processing) the adhesive (adhesion layer) exclusively designed. Accordingly, no release liner is needed.

This reduces the weight of the polarizing film obtained by step A1 or step A2 by the weight of an adhesive and a release liner compared to conventional polarizing films, which enables the polarizing film to be transported at one time in large quantity.

As indicated in step B1 or step B2, it is possible to reduce the lead time for manufacturing polarizing films because there is no need to cure the adhesion layer just before adhering the polarizing film to the liquid crystal panel. Further, it is possible to extend the quality guarantee period for the polarizing film because there is a low possibility of the adhesion layer being deteriorated because of no adhesion layer in the polarizing film.

ADVANTAGE OF THE INVENTION

According to the method for manufacturing a liquid crystal panel of the present invention, the following advantages are expected, resulting in improvement in manufacturing efficiency of liquid crystal panels:
(A) It is possible to increase the area per unit weight of a polarizing film at least 1.8 times.
(B) This is advantageous to transport the polarizing film.
(C) It is possible to reduce the lead time for manufacturing a polarizing film at least by 3 to 10 days.
(c) It is possible to extend the quality guarantee period of the polarizing film at least by 6 months.

DESCRIPTION OF THE PREFERRED EMBODIMENTS

[Manufacturing Method of the Present Invention]

A manufacturing method of the present invention is a method for manufacturing a liquid crystal panel including a polarizing film which includes a laminate composed of a first base film or a second base film and a polarizing thin layer, an adhesion layer, and a liquid crystal cell in this order, wherein step A1 and step B1 or step A2 and step B2 may be included as will hereinafter be described. The manufacturing method of the present invention may include any other steps other than step A1 and step B1 or step A2 and step B2. Examples of such a step typically includes a step of winding up the polarizing film to be transformed into the shape of a roll and a step of stamping out the polarizing film with a die of a predetermined panel size.

[Step A1]

In a manufacturing process of a polarizing film including a laminate composed of a first base film and a polarizing thin layer, step A1 of the present invention comprises: applying a vinyl alcohol-based polymer on a surface of the first base film to form a vinyl alcohol-based polymer thin layer; and wet dyeing the vinyl alcohol-based polymer thin layer after stretching the thin layer together with the first base film to obtain a polarizing thin layer. The polarizing film may further include a phase-difference film or the like.

[Step A2]

In the manufacturing process of a polarizing film including a laminate composed of a second base film and a polarizing thin layer, step A2 of the present invention comprises: applying a vinyl alcohol-based polymer on a surface of the first base film to form a vinyl alcohol-based polymer thin layer; wet dyeing the vinyl alcohol-based polymer thin layer after stretching the thin layer together with the first base film to obtain a polarizing thin layer; and releasing the first base film while or after laminating a plane of the polarizing thin layer, which is not in contact with the first base film, on the second base film.

In the case where optical characteristics and mechanical characteristics of the first base film are deteriorated by being stretched and dyed, it is preferable to use step A2 instead of step A1.

The polarizing film obtained by going through step A1 or step A2 is not easily affected by temperatures and humidity, so that the polarizing film has extremely few dimension changes caused by temperatures and humidity. Since the dimension changes of the polarizing film are usually controlled by the polarizing thin layer that tends to be most stretchable, the polarizing film of the present invention that has few dimension changes has a small dimension change rate as a whole. As a result, it is not necessary to previously laminate (adhesion processing) an adhesive (adhesion layer) exclusively designed on the polarizing film obtained by step A1 or step A2.

It is possible to limit the dimension change rate (absolute value) of the polarizing film obtained by step A1 or step A2 at least to 0.2% or lower, preferably to 0.1% or lower, more specifically, when storing the polarizing film in a constant temperature environmental test laboratory at 80° C. for 500 hours.

Although it is not fully identified why the dimension change rate of the polarizing film obtained by step A1 or step A2 is small, the inventors of the present invention assume that the following (1) to (3) are functioned in combination:

(1) to form a vinyl alcohol-based polymer thin layer by applying a vinyl alcohol-based polymer on a surface of a first base film, where this thin layer is closely laminated on the first base film without an adhesive or the like.

(2) to stretch the vinyl alcohol-based polymer thin layer and the first base film together instead of stretching the thin layer alone.

(3) to form a polarizing thin layer by wet dyeing the vinyl alcohol-based polymer thin layer after stretching the thin layer and the first base film.

The laminate obtained by step A1 comprises the first base film and the polarizing film, in which the thickness of the laminate varies according to the thickness of the first base film to be used, but is preferably 21 μm to 90 μm.

The laminate obtained by step A2 comprises the second base film and the polarizing thin layer, in which the thickness of the laminate varies according to the thickness of the second base film to be used, but is preferably 21 μm to 90 μm.

The polarizing thin layer needs to be a thin layer so that the dimension change rate of the laminate may be minimized. The term "a thin layer" herein means a thin layer having a thickness of 1 μm or greater to less than 10 μm. A film having a thickness of 10 μm or greater is referred to as "a thick film." The polarizing thin layer preferably has a thickness of 1 μm to 6 μm, more preferably 1 μm to 4 μm.

When the polarizing thin layer has a thickness of less than 1 μm, absorption of polarization in an absorption axis direction becomes insufficient, so that it is impossible to put the polarizing film into practical use. When the polarizing thin layer has a thickness of over 6 μm, the dimension change rate of the polarizing film excessively becomes greater, which is not preferable.

The polarizing thin layer preferably has a polarization degree of 99% or higher and a transmittance of 39% to 46%.

The first base film obtained by step A1 or step A2 is so excellent in smoothness that a vinyl alcohol-based polymer thin layer may be formed by uniformly applying a vinyl alcohol-based polymer on the first base film, and in addition to that, the first base film that is excellent in stretchability to stretch the aforementioned thin layer in a state of being closely laminated is preferably used.

Examples of a material of the first base film typically include an olefin-based polymer, a norbornene-based polymer, an acrylic-based polymer and a blended polymer thereof. To increase adhesion of the vinyl alcohol-based polymer thin layer, the first base film may preferably have an easily adhesive layer such as an urethane resin. The first base film before stretching preferably has a thickness of 50 μm to 200 μm. And the first base film after stretching preferably has a thickness of 20 μm to 80 μm. Further, when the first base film has an easily adhesive layer, the range of the thickness includes the easily adhesive layer.

The second base film to be used in step A2 that is so superior in smoothness that the polarizing thin layer can be laminated and excellent in transparency so as to maintain optical characteristics of the aforementioned polarizing thin layer even in a laminated state is preferably used. Examples of a material of the second base film typically include a cellulose-based polymer, a norbornene-based polymer, an acrylic-based polymer and a blended polymer thereof or the like. The second base film preferably has a thickness of 20 μm to 80 μm. In step A2, means for laminating the polarizing thin layer and the second base film is not particularly limited, but a method for pressure bonding between the polarizing thin layer and the second base film with a roll through an aqueous adhesive or the like is used.

The vinyl alcohol-based polymer to be used in step A1 or step A2 is typically polyvinyl alcohol or ethylene vinyl alcohol copolymers. The polyvinyl alcohol is obtained by saponifying and hydrolyzing a polyvinyl acetate vinyl and the ethylene vinyl alcohol copolymers are obtained by saponifying and hydrolyzing ethylene acetate vinyl copolymers.

In step A1 or step A2, the vinyl alcohol-based polymer is dissolved in a proper solvent (for example, hot water) to turn into a solution and then is applied on a surface of the first base film with any coater to form a vinyl alcohol-based polymer thin layer. The vinyl alcohol-based polymer thin layer before stretching preferably has a thickness of 2 μm to 20 μm.

In step A1 or step A2, the laminate composed of the vinyl alcohol-based polymer thin layer and the first base film is stretched in vertical, horizontal or an oblique directions by any stretching apparatus (for instance, a tenter stretching machine). As mentioned above, it is possible to uniformly stretch the thin layer without fracturing the thin layer by stretching the thin layer together with the first base film. The stretching magnification at this time is set in accordance with optical characteristics of the polarizing thin layer to be eventually obtained, but is preferably triple to septuple. The stretching temperature in this case is preferably 100° C. to 180° C.

The first base film and the thin layer stretched in step A1 or step A2 are immersed in a dyeing bath containing a dichroic material (such as iodine or an organic dye) and wet dyeing is carried out. Therefore, the thin layer becomes a polarizing thin layer having organic functions. It is possible to prevent the first base film from being dyed by the use of a hydrophobic resin (for instance, norbornene-based polymer) without a hydroxyl group as a material of the first base film. The temperature of the dyeing bath is preferably 10° C. to 50° C. The total time to immerse the stretched first base film and the thin layer is preferably 5 seconds to 240 seconds.

It is presumed by the inventors of the present invention that there are advantages in reducing internal stress and the dimension change rate of the polarizing thin layer by immersing the vinyl alcohol-based polymer thin layer in a dyeing bath to swell the thin layer after being stretched. Reduction effect of internal stress is particularly superior in the present invention when wet dyeing the first base film and the thin layer after dry stretching at a high temperature (for example, 130° C. to 180° C.).

The polarizing film including the laminate obtained by step A1 or step A2 is stored and transported without adhesive processing (lamination of an adhesion layer) like conventional one. Accordingly, an adhesive and a release liner are not added to the polarizing film.

The polarizing film including the laminate obtained by step A1 or step A2 is lighter than conventional polarizing films at least by the weight of an adhesive and a release liner. Since the weight of the adhesive and the release liner accounts for 15% to 25% of the total weight in conventional polarizing films, it is of great significance to remove the adhesive and the release liner.

It is possible to enlarge the area of the polarizing film at least 1.8 times as large as per unit weight. As a result, it is possible to increase the quantity (area) of the polarizing film that can be loaded on a certain truck.

Further, it becomes unnecessary to cure an adhesive because no adhesive is laminated on the polarizing film. It was necessary for conventional polarizing films to cure (processing to advance cross-linking reaction) an adhesive at least for 3 to 10 days to allow the adhesive to fully exert adhesive characteristics. According to the present invention, it is possible to reduce the lead time for producing polarizing films (the number of days required for manufacturing) at least by the aforementioned period. This results in significant improvement in manufacturing efficiency of the polarizing films.

Additionally, in the present invention, there are no fears that the adhesive may be deteriorated during storage because no adhesive for adhering the liquid crystal panel is laminated on the polarizing film. In conventional polarizing films, it was necessary to set up a short quality guarantee period (a period to maintain the quality of the polarizing film in the state prior to the adhesion to the liquid crystal panel). According to the present invention, it is possible to extend the quality guarantee period of the polarizing film at least by 6 months.

[Step B1 and Step B2]

Steps B1 and B2 of the present invention are respectively a step of manufacturing a liquid crystal panel by adhering a polarizing film without adhesion processing during storage and transportation at least to one surface of the liquid crystal cell through an adhesion layer. That is, in the polarizing film to be used in the present invention, an adhesion layer such as an adhesive is laminated on the polarizing film preferably just before adhering to the liquid crystal panel. In step B1 or step B2, a step of forming an adhesion layer on the polarizing film or an adhesion surface of the liquid crystal cell and a step of adhering the polarizing film to the liquid crystal cell are preferably carried out by a series of production lines.

The aforementioned term "during storage and transportation" typically means a storage period of a polarizing film supplied from the polarizing film manufacturing process (step A1 or step A2) to the liquid crystal panel manufacturing process (Step B1 or step B2) and a period until the polarizing film has reached the liquid crystal panel manufacturing process. Steps A1 and B1 or steps A2 and B2 may be performed in one manufacturing plant, alternatively, in two or more manufacturing plants. Step A1 or step A2 is preferably performed in a polarizing film manufacturing plant and step B1 or step B2 is performed in a liquid crystal panel plant without an adhesion layer for adhering to the liquid crystal cell after transporting the obtained polarizing film to the liquid crystal panel plant. According to such an embodiment, the advantages (A) to (c) of the present invention make a supply chain of the liquid crystal panel remarkably efficient.

The polarizing film has a small dimension change rate due to the inclusion of the laminate manufactured in step A1 or step A2. Accordingly, there is no need for strong adhesion to protect the polarizing film from peeling off and strong stress relaxation to prevent the leakage of light which were needed for adhesives for conventional polarizing films. In other words, it is possible to adhere the polarizing film to a surface of the liquid crystal cell with an adhesion layer using any adhesive, such as an adhesive for a general purpose. This makes it possible to use an adhesive without the need of curing.

Any adhesion layer that allows the polarizing film to be closely laminated on a surface of the liquid crystal cell is applicable. Examples of a material for forming the adhesion layer include an aerosol adhesive (spray glue) and a hydrophilic polymer or the like. The thickness of the adhesion layer is not particularly limited, but may be some μm to ten some μm or may be such a thin layer (a hair line) that is impossible to detect by the naked eye. When the polarizing film is adhered to the liquid crystal cell, the adhesion layer may be arranged on the polarizing film side, alternatively, may be arranged on the liquid crystal cell side.

[Liquid Crystal Panel]

The liquid crystal panel to be obtained by the manufacturing method of the present invention comprises in this order: a polarizing film including a laminate composed of a first base film or a second base film and a polarizing thin layer; an adhesion layer; and a liquid crystal panel. The liquid crystal panel may include any other members, as far as the liquid crystal panel includes the aforementioned members.

The liquid crystal cell is generally formed by filling low-molecular-liquid crystals between two substrates as a display medium. In general, a color filter, an opposite electrode, and an oriented film are provided on one substrate on which a liquid crystal cell is formed and a liquid crystal driving electrode, a wiring pattern, a thin-film transistor, and an oriented film are arranged on the other substrate.

The liquid crystal cell may be transmission-type or reflection-type or semi-reflection and semi-transmission-type. The operation mode of the liquid crystal cell is not particularly limited, but may be a Twisted Nematic mode, a Vertical Alignment, Optically Compensated Bend (OCB), and IPS (In-Plane Switching) or the like.

EXAMPLES

Example 1

Step A1

A polyvinyl alcohol film with 2,400 in average degree of polymerization (produced by KURARAY CO., LTD.; product name: VF-PS2400) was cut into small pieces with a side of 5 mm or less and the pieces were dissolved in hot water at 95° C. to obtain an aqueous solution 10% by weight. This solution was applied on a surface of a norbornene resin film-based first base film with a thickness of 150 μm (produced by JSR CORPORATION; product name: ARTON) and then dried at 120° C. for 10 minutes to form a polyvinyl alcohol thin layer with a thickness of 12 μm on the surface of the first base film.

The aforementioned first base film and polyvinyl alcohol thin layer were stretched in a width direction to a stretch ratio of 4.5 times with a tenter under heating at 143° C. in an oven and further immersed in a dyeing bath at 30° C. for 1 minute to be wet dyed. In this manner, a laminate composed of the first base film (thickness: 57 μm) and a polarizing thin layer (thickness: 3 μm, polarization degree: 99%, transmission rate: 41.5%) was produced. The dyeing bath includes iodine/potassium iodine/water=1:10:100 in weight ratio.

The dimension change rate (one-dimensional expansion or shrinkage ratio) of the produced laminate (polarizing film) was 0.05% when stored in a constant temperature environmental test laboratory at 80° C. for 500 hours (shrinkage). The polarizing film having a phase difference film, wherein the phase difference film was laminated on the laminate (polarizing film) was 20% lighter than conventional polarizing films with an identical phase difference film in total weight due to no adhesive and releasing liner.

Step B1

The aforementioned polarizing film was transported to the liquid crystal panel manufacturing process to be adhered to a liquid crystal cell (which is equipped with KDL20J3000 produced by SONY CORPORATION) by spraying an aerosol adhesive (spray-type paste 77 produced by 3M Limited) to one surface of the polarizing film just before being adhered to the liquid crystal cell. In the obtained liquid crystal panel, the polarizing film was not released and no leakage of light occurred caused by the generation of distortion.

Example 2

Step A2

A granule polyvinyl alcohol (produced by JAPAN VAM & POVAL CO., LTD.; product name: JC25) of 99.0% by mole in degree of saponification is dissolved in hot water to obtain a solution with a concentration of 10% by weight. A laminate was prepared composed of a first base film and a polarizing thin layer in the same manner as in Example 1 except for the use of this solution. Next, a triacetyl cellulose-based second base film (produced by FUJIFILM CORPORATION, product name: FUJITAC) was adhered to a polarizing thin layer-side of the laminate through an aqueous adhesive and then the first base film was removed to obtain a laminate composed of the second base film and the polarizing thin layer.

Step B2

The aforementioned polarizing film was adhered to a liquid crystal cell in the same manner as in Example 1 to obtain a liquid crystal panel. Neither peeling off of the polarizing film nor leakage of light caused by distortion occurred on the obtained liquid crystal panel.

[Measuring Method for Dimension Change Rate]

A sample was cut out with a size of 120 mm×120 mm along an absorption axis of the polarizing thin layer and then taken out after storing in a constant temperature environmental test laboratory at 80° C. for 500 hours to obtain the size before and after the test from the following equation:

$$\text{Dimension change rate} = [(\text{length after test} - \text{length before test})/\text{length before test}] \times 100$$

The dimension change rate with a greater change rate was applied after studying two directions; an absorption axis direction and a direction diagonal to the absorption axis direction.

INDUSTRIAL APPLICABILITY

According to the method for manufacturing a liquid crystal panel of the present invention, it is possible to improve efficiency in manufacturing a liquid crystal panel as follows:
(A) It is possible to increase the area per unit weight of a polarizing film at least 1.8 times. This is advantageous to transport the polarizing film.
(B) It is possible to reduce the lead time for manufacturing a polarizing film at least by 3 to 10 days.
(C) It is possible to extend the quality guarantee period of the polarizing film at least by 6 months.

What is claimed is:

1. A method for manufacturing a liquid crystal panel including a polarizing film which includes a laminate composed of a first base film and a polarizing thin layer having a polarization degree of 99% or higher and a transmittance of 39% to 46%, an adhesion layer, and a liquid crystal cell in this order, the method comprising the steps of:

(step A1) manufacturing a polarizing film roll, the step comprising:

applying a vinyl alcohol-based polymer on a surface of the long first base film to form a vinyl alcohol-based polymer thin layer;

wet dyeing the vinyl alcohol-based polymer thin layer after stretching the thin layer together with the long first base film to obtain a polarizing thin layer to provide the polarizing film in a polarizing film manufacturing process;

winding up the polarizing film to be the polarizing film roll; and storing and transporting the polarizing film roll without an adhesion layer, and (step B1) performing a first step of forming an adhesive layer on an adhesive surface of one of the polarizing film and the liquid crystal cell while rewinding the polarizing film roll and a second step of adhering the polarizing film to the liquid crystal cell, the first and second steps being carried out in a series of production lines of a liquid crystal panel manufacturing process.

2. A method for manufacturing a liquid crystal panel including a long polarizing film which includes a laminate composed of a second base film and a polarizing thin layer having a polarization degree of 99% or higher and a transmittance of 39% to 46%, an adhesion layer, and a liquid crystal cell in this order, the method comprising the steps of:

(step A2) manufacturing a polarizing film roll including a laminate composed of a long second base film and a polarizing thin layer, the step comprising:

applying a vinyl alcohol-based polymer on a surface of the long first base film to form a vinyl alcohol-based polymer thin layer in a polarizing film manufacturing process;

wet dyeing the vinyl alcohol-based polymer thin layer after stretching the thin layer together with the long first base film to obtain a polarizing thin layer;

releasing the long first base film while or after laminating the polarizing thin layer on the long second base film to provide the long polarizing film;

winding up the long polarizing film to be the polarizing film roll; and storing and transporting the polarizing film roll without an adhesion layer; and (step B2) performing a first step of forming an adhesive layer on an adhesive surface of one of the polarizing film and the liquid crystal cell while rewinding the polarizing film roll and a second step of adhering the polarizing film to the liquid crystal cell, the first and second steps being carried out in a series of production lines of a liquid crystal panel manufacturing process.

3. The method according to claim 1, further comprising the steps of: manufacturing the polarizing film in step A1 in a polarizing film manufacturing plant; transporting the obtained polarizing film roll without an adhesion layer for adhering to the liquid crystal cell to a liquid crystal panel manufacturing plant; and performing step B1 in the liquid crystal panel manufacturing plant.

4. The method according to claim 2, further comprising the steps of:

manufacturing the polarizing film in step A2 in a polarizing film manufacturing plant; transporting the obtained polarizing film roll without an adhesion layer for adhering to the liquid crystal cell to a liquid crystal panel manufacturing plant; and performing step B2 in the liquid crystal panel manufacturing plant.

5. The method according to any one of claims 1 to 4, wherein the polarizing thin layer has a thickness of 1 µm to 6 µm.

* * * * *